United States Patent [19]
Longsdorf et al.

[11] Patent Number: 6,006,338
[45] Date of Patent: Dec. 21, 1999

[54] PROCESS TRANSMITTER COMMUNICATION CIRCUIT

[75] Inventors: Randy J. Longsdorf, Chaska; Grant B. Edwards, Minneapolis; Richard L. Nelson, Chanhassen; David L. Pederson, Hopkins, all of Minn.

[73] Assignee: Rosemont Inc., Eden Prairie, Minn.

[21] Appl. No.: 08/890,169

[22] Filed: Jul. 9, 1997

Related U.S. Application Data

[60] Provisional application No. 60/059,976, Oct. 4, 1996.

[51] Int. Cl.$^6$ .................................................. G01C 25/00
[52] U.S. Cl. ........................... 713/340; 710/100; 710/126
[58] Field of Search .......................... 395/750.01–750.08, 395/280, 306

[56] References Cited

U.S. PATENT DOCUMENTS

| | | | |
|---|---|---|---|
| 3,778,634 | 12/1973 | Hanrihan | 307/64 |
| 4,542,452 | 9/1985 | Fukai et al. | 364/141 |
| 4,808,917 | 2/1989 | Fernandes et al. | 324/127 |
| 5,089,974 | 2/1992 | Demeyer et al. | 364/492 |
| 5,187,474 | 2/1993 | Kielb et al. | 340/870.18 |
| 5,495,769 | 3/1996 | Broden et al. | 73/718 |
| 5,586,050 | 12/1996 | Makel et al. | 364/509 |
| 5,606,513 | 2/1997 | Louwagie et al. | 364/510 |

FOREIGN PATENT DOCUMENTS 0 433 995 A2   6/1991   European Pat. Off. .

OTHER PUBLICATIONS

Fisher–Rosemount® Promotion, Model 3051C Smart Pressure Transmitter Family, MAN 4001A00, Apr. 1994.
Fisher–Rosemount® Promotion, Model 8712C/U Magnetic Flowmeter Transmitters, 00809–0100–4729 Rev. A1.
Fisher–Rosemount® Promotion, "Understanding Fieldbus", 00816–0010–3218, Jan. 1996.
Hart® Field Communication Protocol, "A Technical Overview" HCF LIT 20, Revision Dec. 2, 1994.

*Primary Examiner*—Ayaz R. Sheikh
*Assistant Examiner*—Jigar Pancholi
*Attorney, Agent, or Firm*—Westman, Champlin & Kelly, P.A.

[57] ABSTRACT

A process transmitter communications circuit has link terminals which are coupled to a process link, which supplies power to the circuit. A power source is coupled to one of the link terminals and is independent from the power supplied from the process link. Communications circuitry is coupled to the power source and link terminals, which transmits a transmitter signal over the process link, through the link terminals. A power sensing component is coupled to at least one of the link terminals and the communications circuitry and senses whether the power supplied by the process link is inadequate to transmit the transmitter signal. A power control component is coupled to the power source, the link terminals and the communications circuitry and selectively applies power from the power source to the communications circuitry for transmitting the transmitter signal when the power sensing component senses there is inadequate power supplied by the process link.

20 Claims, 7 Drawing Sheets

PROCESS TRANSMITTER COMMUNICATION CIRCUIT

CROSS-REFERENCE TO RELATED APPLICATION

This application claims priority from U.S. Ser. No. 08/725,460, which was filed Dec. 4, 1996, and was converted to Provisional Application Ser. No. 60/059,976 with a petition filed Oct. 4, 1996.

BACKGROUND OF THE INVENTION

This invention relates to transmitters of the type used in the process control industry. More specifically, this invention relates to a process transmitter having a communications circuit for transmitting information over a process link.

Process transmitters are used to monitor industrial processes and responsively transmit information relating to the industrial process to a process device, such as a control room, a controller, another process transmitter, or a process control such as a valve. For example, various fluid process variables such as level, flow, mass, pressure, and temperature are monitored and transmitted to the process device at facilities such as oil refineries, wood pulp processing plants, or chemical plants. Process transmitters are typically contained in an explosion-proof housing and are frequently located to monitor an industrial process in areas that are difficult to physically access with nearby hazards. For example, a process transmitter may be located in an area such as on top of a many thousand gallon tank or in a confined space. Hazards in the vicinity of process transmitters include machinery, chemicals, radiation, temperature extremes, and high voltage.

The process transmitter communicates an information signal to a process device over process link wires. In some applications, the wires coupling the process transmitter to the process device are configured with dedicated wires such as a process loop, and, in other applications, the wires are configured as common wires such as a process bus. The information signal includes signals representing one or more process parameters and signals representing process transmitter information such as configuration and status. These signals may be digital signals, analog signals, or a combination of digital and analog signals configured according to a process communications protocol. The information signal is transmitted over the process link to the process device where the information signal is interpreted and decisions are made concerning the process or the process transmitter based upon the information signal. In most previous transmitters, the process link requires power before the process transmitter is capable of generating an information signal.

Before a process transmitter is installed to monitor an industrial process, the process transmitter is connected to a communicator such as a Rosemount® Model 268 HART® Smart Family interface for diagnostic testing and setup. Diagnostic testing is performed to validate that the process transmitter is operating according to the manufacturer's specifications. Process transmitter setup, also known as commissioning, is performed to program the transmitter with information that relates to the particular process to be monitored such as transmitter configuration, transmitter address, installation temperature, and transmitter height. Previous process transmitters require connection to a powered process link, which comprises a power supply such as a 10–30V DC battery and a load resistor such as a 250Ω or greater resistor, to measure current flowing through the process link. Connection to the power supply and load resistor can make commissioning of a process transmitter inconvenient and time consuming.

Field diagnostic testing and set-up changes to installed process transmitters are sometimes difficult and dangerous because process transmitters are often located in areas that are difficult to access and potentially hazardous. As discussed above, some previous process transmitters require connection to a powered process link comprising a power supply and load resistor. Physically transporting a power supply and a load resistor into a difficult to access and potentially hazardous area can make field diagnostic testing and set-up changes to an installed process transmitter inconvenient, time consuming, and dangerous.

When the power on the process link becomes insufficient to support communications, previous current sink process transmitters are unable to communicate over the process link to a process device to report the status of the transmitter or process. When the transmitter is unable to communicate, a service person may be dispatched to physically check the transmitter and provide alternate means for reporting process conditions. In some situations, before a service person is permitted access to the transmitter, the process may have to be halted or delayed to provide a safe environment for the service person. Halting or delaying the process often results in process complications such as unacceptable process product, lost process production time, and undergoing start-up procedures.

For the foregoing reasons, a process transmitter is needed that can be commissioned and, while installed, undergo diagnostic testing and set-up all without the inconvenience of providing power on the process link. A process transmitter is also needed that, once installed, has the capability to communicate when there is inadequate power on the process link.

SUMMARY OF THE INVENTION

The process transmitter communications circuit of the present invention has link terminals which are coupled to a process link which supplies power to the circuit. A power source which is coupled to one of the link terminals and is independent from the power supplied from the process link. Communications circuitry is coupled to the power source and link terminals, which transmits a transmitter signal over the process link, through the link terminals. A power sensing component is coupled to at least one of the link terminals and the communications circuitry and senses whether the power supplied by the process link is inadequate to transmit the transmitter signal. A power control component is coupled to the power source, the link terminals and the communications circuitry and selectively applies power from the power source to the communications circuitry for transmitting the information signal when the power sensing component senses there is inadequate power supplied by the process link.

In a first embodiment of the process transmitter communications circuit, the power sensing component includes a diode coupled between the power source and the link terminals. In some versions of the process transmitter communications circuit, the diode also serves as the power control component. In a second embodiment, the power sensing component includes a voltage divider and the power control component includes a microprocessor.

The present invention also includes a method for communicating with the process transmitter over the process link by sensing the process link voltage, determining whether there is inadequate power on the process link to transmit the transmitter signal and, if there is inadequate power, supplying adequate power to transmit the transmitter signal from the power source.

DETAILED DESCRIPTION OF THE PREFERRED EMBODIMENTS

Figure 1:
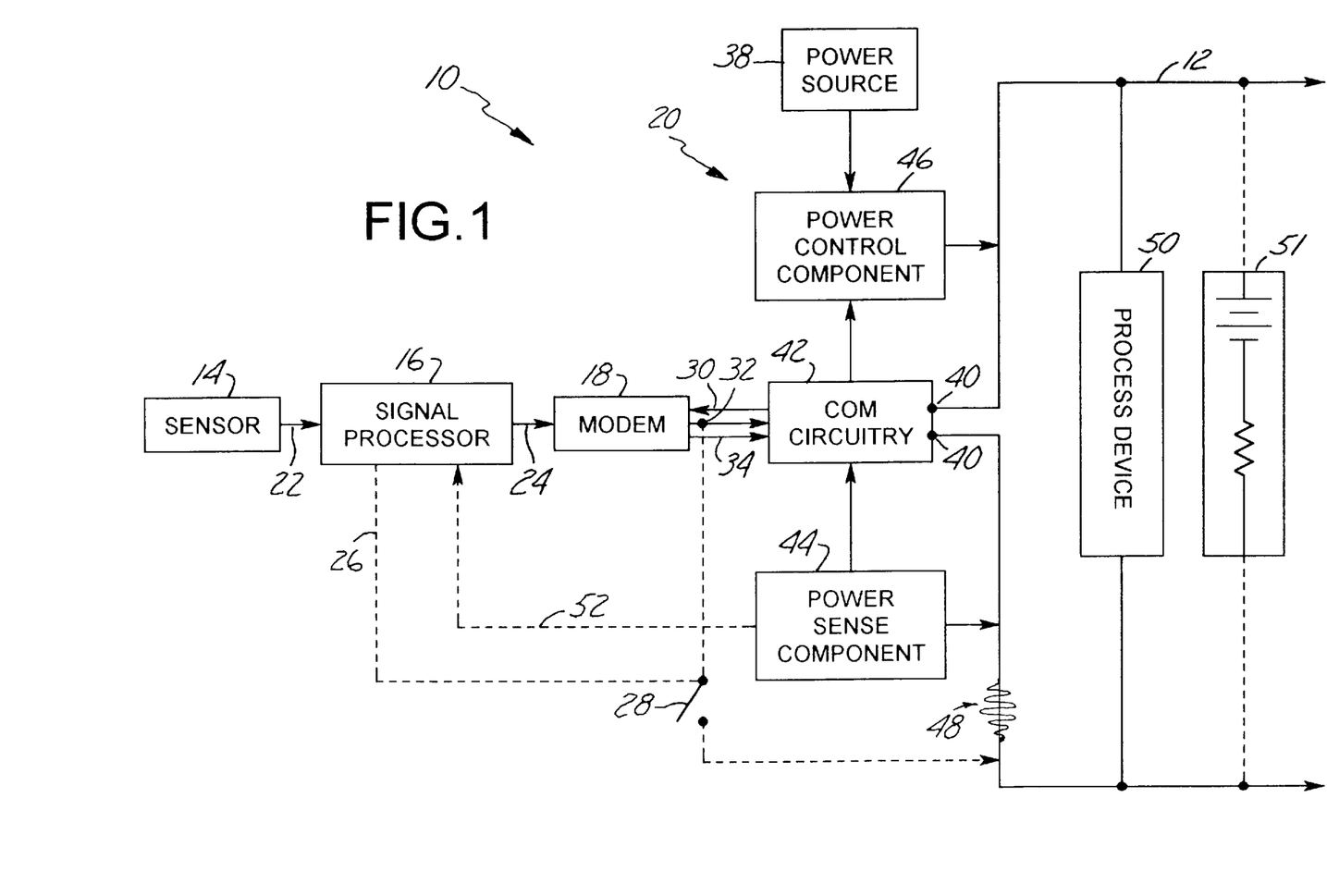
FIG. 1 is a block diagram of a process transmitter according to the present invention.

FIG. 1 is a block diagram of a process transmitter 10 which is connected to a process link 12, according to the present invention. The process transmitter 10 includes a sensor 14, a signal processor 16, a modem 18, and a communications circuit 20. The sensor 14 includes a transducer coupled to a process that produces an analog electrical sensor signal 22 which is representative of a process parameter such as level, mass, flow, pressure, or temperature. The signal processor 16 takes the analog sensor signal 22 and generates a modified sensor signal 24 by converting the sensor signal to a digital signal and modifying the digital signal to improve characteristics such as linearity. The modem 18 includes a receive signal line 30, a transmitter signal line 32, and a process signal line 34. The modem 18 receives the modified sensor signal 24 and converts the modified sensor signal 24 into a process signal, which is representative of the measured process variable, and applies the process signal to the process signal line 34. The process signal is typically analog and is compatible with a selected communications protocol. Modem 18 also generates a digital, modulated transmitter information signal on the transmitter signal line 32, which may represent the measured process variable or status information, for example. The modem 18 includes the capability to convert between analog signals and digital signals. In some configurations, the signal processor 16 has a control line 26 that is coupled to a switch 28. When switch 28 is closed, the transmitter information signal may be applied directly to the process link 12 as a voltage, rather than being applied through the communications circuitry 42 as a modulated current.

The communications circuit 20 includes a power source 38, link terminals 40, communications circuitry 42, at least one power sensing component 44, and at least one power control component 46. The power source 38 supplies power to the process transmitter 10 independently from the power available on the process link 12. In some configurations, the power source 38 also supplies power to other components of process transmitter 10 such as the modem 18 and signal processor 16. In embodiments having four wires the power source 38 includes a pair of wires which are connected to an external power supply (not shown) such as a 5–25V DC power supply. In embodiments having two wires, the power source 38 is internal to the process transmitter 10 and includes a battery or capacitor, for example.

In the two-wire embodiment, the process transmitter 10 receives its operating power from the process link 12 through process link terminals 40. The process link 12 provides connectivity between the process transmitter 10 and another process device 50 such as a communicator, a second process transmitter, or a process control to transmit an information signal 48. In addition to the process device 50, in some versions of the invention, a controller 51 such as found in a process control room is connected to the process link terminals 12. Some of the most common types of process links 12 include a process loop, a process bus, a point-to-point, a daisy-chain, and a tree.

The communications circuitry 42 is coupled to the power source 38, the modem 18 and link terminals 40 to transmit the process signal and the transmitter information signal onto the process link 12 according to selected communications protocols. The process signal is transmitted on the process link 12 by controlling the level of current through the process link 12 between 4–20 mA, for example. The information signal is shown as a modulated signal 48 on the current through the process link 12. Two of the communications protocols available for the process transmitter 10 to communicate the transmitter information signal 48 are the Highway Addressable Remote Transducer (HART®) communications protocol, which is described in HART® Field Communications Protocol, A Technical Overview (1994) available from the HART Communications Foundation in Austin, Tex. USA, and the Fieldbus communications protocols such as Foundation™ Fieldbus, Controller Area Network (CAN), Lonworks, and Profibus. Foundation Fieldbus is described in Understanding Fieldbus (1996) available from Rosemount Measurement in Eden Prairie, Minn., USA. With the HART communication protocol, the analog process signal generated by the communications circuitry 42 over the process link 12 is preferably a 4–20 mA DC analog signal, and the information signal 48 is a digital signal having a frequency of 1200 Hz and 2200 Hz at 1.0 mA peak-to-peak modulated on the analog process signal. In another form of the HART communications protocol, both the process signal and the transmitter signal are digital signals modulated on a substantially fixed current in the range from about 1–10 mA, preferably about 4 mA DC. With the Fieldbus communications protocol, both the process signal and the transmitter signal are digital signals modulated on a substantially fixed current in the range from about 4–20 mA DC and preferably about 16 mA DC.

The power sensing component 44 is coupled to at least one link terminals 40 to measure the voltage on the process link 12 and determine whether there is inadequate power on the process link 12 to transmit the information signal 48. In some configurations, the power sensing component 44 has a sense line 52 that is coupled to the signal processor 16.

The power control component 46 is coupled to the power source 38 and the link terminals 40. When the power sensing component 44 determines there is inadequate power on process link 12, the power control component 46 directs a predetermined amount of power from the power source 38 to the communications circuitry 42 which is modulated by the communications circuitry to generate the information signal 48.

1. First Embodiment

Figure 2:
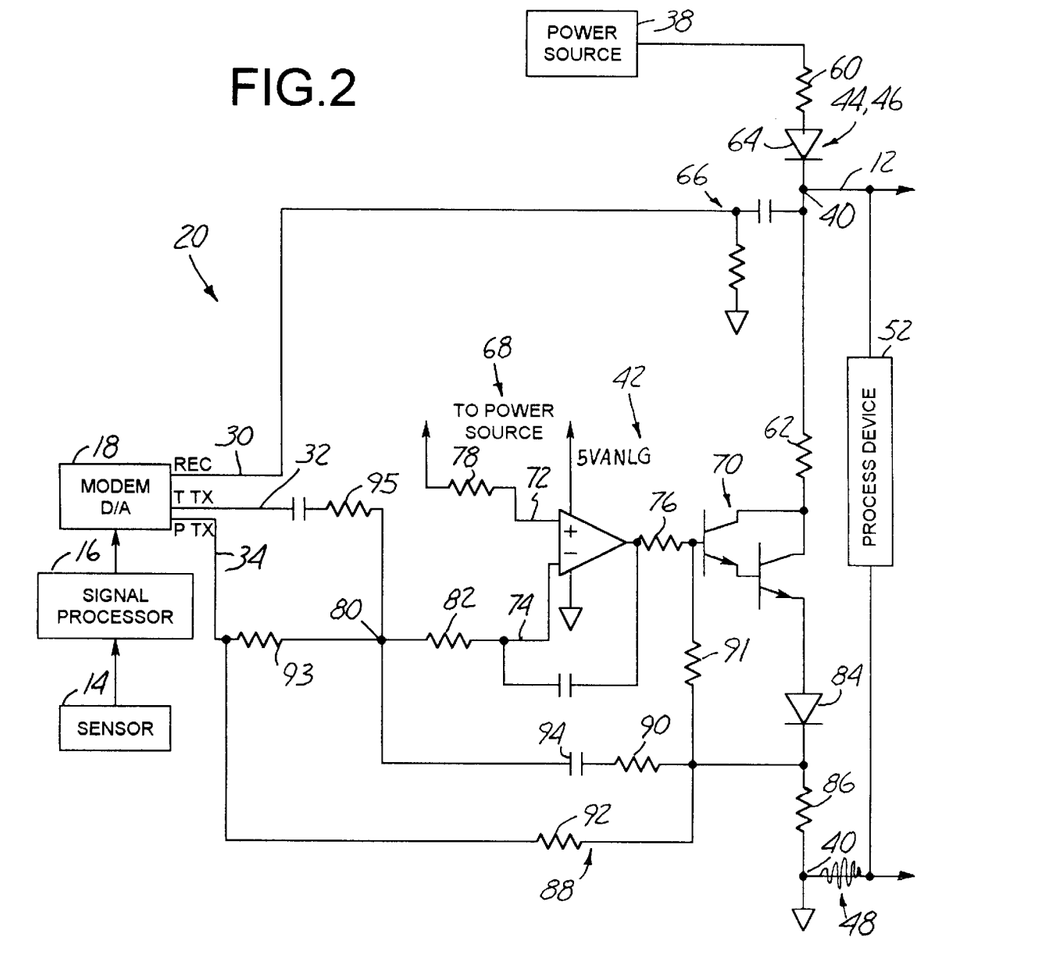
FIG. 2 is a schematic of a first embodiment of the process transmitter communications circuit.

FIG. 2 is a schematic diagram of the process transmitter communications circuit 20 according to a first embodiment of the present invention. This embodiment includes a 4–20 mA loop transmitter, where the process signal is the analog 4–20 mA portion of the information signal, and the transmitter signal is the digital portion of the information signal which is superimposed on the analog portion. The process transmitter communications circuit 20 includes the power source 38, link terminals 40, communications circuitry 42, and a diode 64. Diode 64 is coupled in series with resistor 60, between power source 38 and one of the link terminals 40. Diode 64 performs the functions of both the power sensing component 44 and the control component 46. Diode 64 also isolates the power source 38 from power supplied over the process link 12. The first embodiment shown in FIG. 2 is preferred when the power source 38 is a relatively large power supply that can supply adequate current to maintain modulator 70 in the linear region which allows transmission of the digital portion of the information signal 48 when power on the process link 12 is interrupted. If the power source 38 operates at a lower level, the embodiment shown in FIG. 2 will still operate to generate the digital portion of the information signal 48 until the current required to generate the analog portion of the information signal 48 exceeds the power source's capability.

The loop current on process link 40 flows through a current path formed between the link terminals 40, which includes resistor 62, modulator 70, diode 84 and resistor 86. For the HART communications protocol, the resistors 60 and 62 are selected along with the other components connected between the link terminals 40 to establish a maximum current of about 20 mA between the link terminals 40.

The communications circuitry 42 includes a receive filter 66, an amplifier 68 and the modulator 70. The receive filter 66 is an analog highpass filter coupled between one of the link terminals 40 and the receive signal line 30 of the modem 18. The receive filter 66 is designed for a particular communications protocol to improve the signal to noise ratio. In some applications, the receive filter 66 will include additional capacitors and resistors that are configured to improve receive signal filtering for a particular environment.

The amplifier 68 is preferably an operational amplifier having a non-inverting input 72, an inverting input 74, and a coupling resistor 76. The non-inverting input 72 is coupled through resistor 78 to a reference voltage of about 2.5 VDC to maintain about 2.5 VDC on the non-inverting input 72, which positions the operational amplifier 68 near the center of its range. The reference voltage is supplied by power source 38. The process signal, which is applied on the process signal line 34, and the transmitter signal, which is applied on the transmitter signal line 32, are summed at node 80 and applied to the inverting input 74 of the operational amplifier 68 through resistor 82. The transmitter signal is an AC signal that is capacitively coupled from the transmitter signal line 32 to the summing node 80, and the process signal is a pulse width modulated signal coupled from the modem process signal line 34 to the summing node 80. The output of the operational amplifier 68 is capacitively coupled to its inverting input 74 to stabilize the operational amplifier 68. A coupling resistor 76 provides voltage isolation between the operational amplifier 68 and the modulator 70.

The modulator 70 is an active device that controls the level of current flowing through the process link 12 and modulates the current in response to the output of the operational amplifier 68 to transmit the process signal and the transmitter signal. The modulator 70 preferably includes a pair of transistors configured as a Darlington pair, the diode 84, the resistor 86, and a feedback circuit 88. The diode 84 in combination with resistor 86 function to hold the output of the modulator 70 at a level above ground to improve performance of the operational amplifier 68. The feedback circuit 88 includes resistors 90 and 92 and capacitor 94. The feedback circuit 88 couples a representation of the information signal 48 to the inverting input 74 of operational amplifier 68 to improve the quality of the information signal 48. Resistor 91 maintains a proper bias on the base of modulator 70. Resistors 93 and 95 provide isolation between the process signal line 34 and the transmitter signal line 32 respectively.

As mentioned above, the diode 64 performs the functions of both the power sensing component 44 and the power control component 46. The diode 64 will be reverse biased when the voltage on the process link 12 exceeds the voltage at the output of the power source 38, and will be forward biased when the voltage on process link 12 drops below a sense threshold of about 0.7 V less than the voltage at the output of the power source 38. In this manner, diode 64 senses when there is inadequate power on process link 12 to transmit the information signal 48.

The diode 64 performs the function of the power control component 46 by becoming forward biased and thereby providing power to the modulator 70 when it determines that there is inadequate power on the process link 12. The diode 64 directs enough current flow from the power source 38 through the link terminals 40 to meet the nominal current value for communications. For example under the HART communications protocol, the nominal current required for communications is about 1.0 mA. The diode 64 is reverse biased when there is adequate power on the process link 12.

Figure 3A:
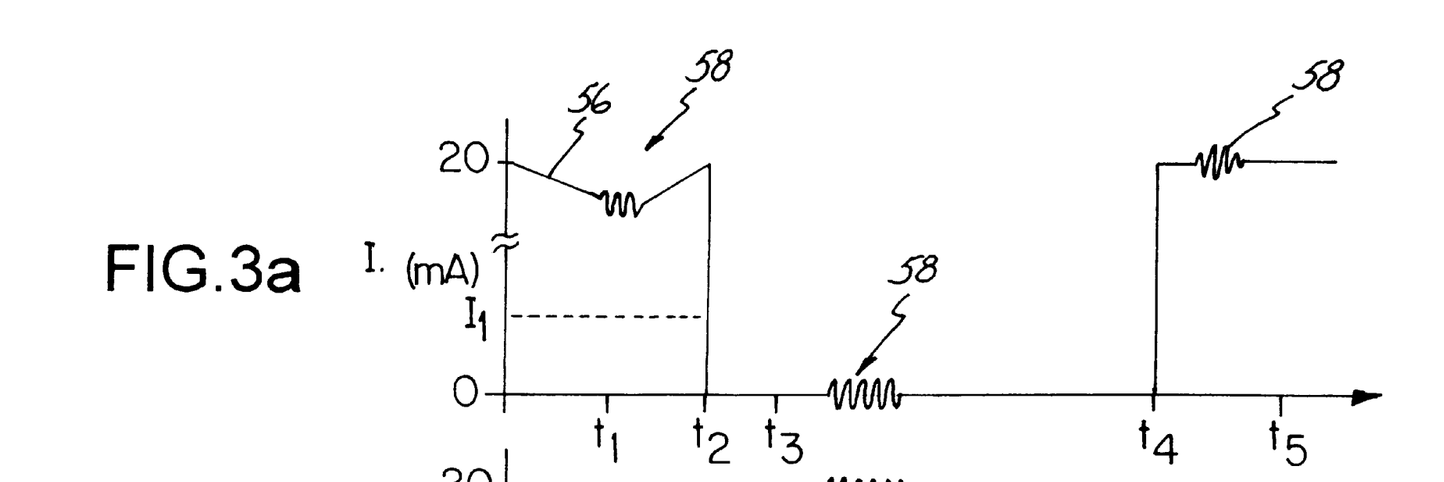
FIGS. 3a and 3b are signal timing diagrams of process link current and power component control current during operation of the first embodiment.
Figure 3B:
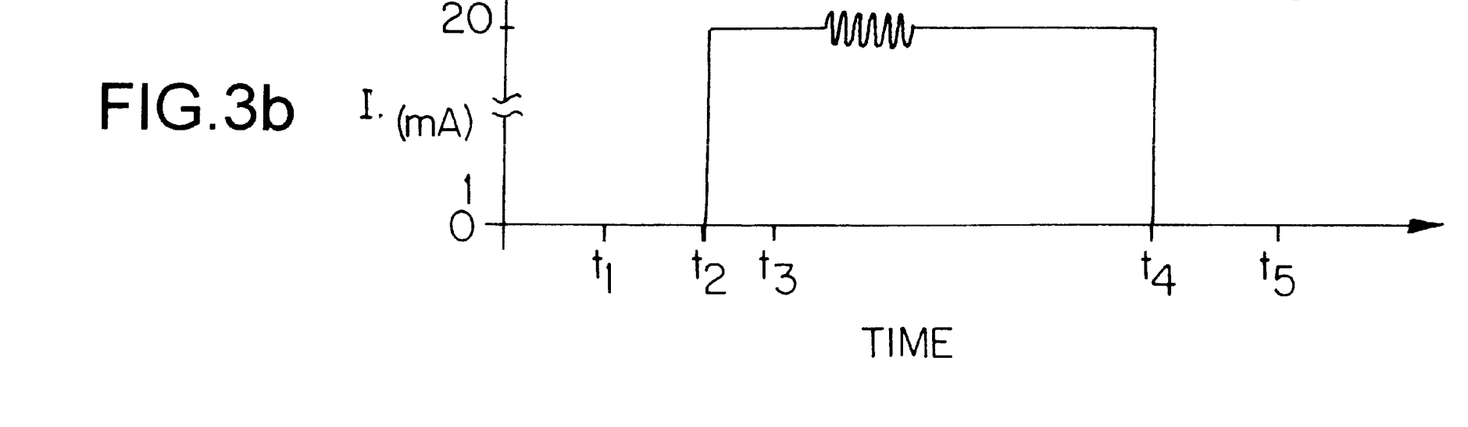

FIGS. 3a and 3b are signal timing diagrams which illustrate the current through the process link 12 and the power control component (diode 64), respectively, and are arranged on the same time base. At time $t_1$, the power on the process link 12 is being provided by the process device 50 (shown in FIG. 1), the diode 64 is sensing the voltage on the process link 12, and the communications circuitry 42 is transmitting the information signal 48. In FIG. 3a, the transmitter signal 58 is shown modulated on the analog process signal 56. In FIG. 3b, there is no current flowing from the power source 38 to the modulator 70 because the diode 64 is reverse biased.

At time $t_2$, the power on process link 12 rapidly drops below the sense threshold, as shown by the drop in current in FIG. 3a. The process transmitter 10 determines there is inadequate power to transmit the transmitter signal 58. Diode 64 becomes forward biased and couples the power source 38 to the process link 12 to supply adequate power to the modulator 70 to transmit the transmitter signal, as shown in FIG. 3b.

At time $t_3$, the power source 38 continues to provide current to the modulator 70 at a level that will support transmission of the transmitter signal. At $t_4$, the power on the process link 12 is restored, as shown by the increase in the current level in FIG. 3a. The diode 64 becomes reversed biased due to an increase in the voltage on the link terminals. This decouples the power source 38 from the modulator 70 and thereby stops the supply of power from the power source 38, as shown by the drop in current in FIG. 3b. At $t_5$, the process transmitter 10 is communicating normally as described above under $t_1$.

2. Second Embodiment

Figure 4:
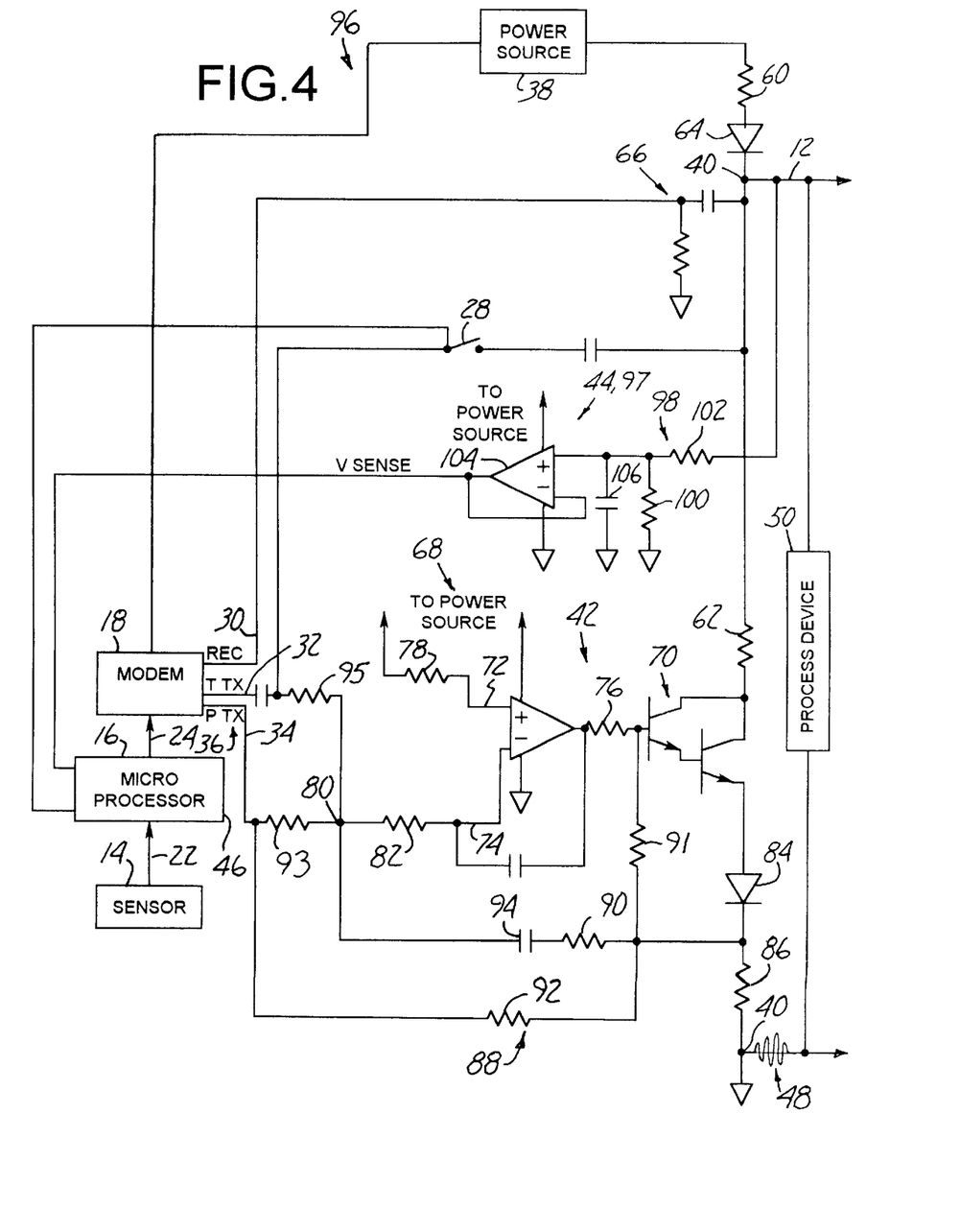
FIG. 4 is a schematic of a second embodiment of the process transmitter communications circuit.

FIG. 4 is a schematic diagram of a process transmitter communications circuit 96 according to a second embodiment of the present invention. This embodiment includes a 4–20 mA portion of the information signal, and the transmitter signal is the digital portion of the information signal which is superimposed on the analog portion. The same reference numerals are used in FIG. 4 as were used in FIGS. 1 and 2 for the same or similar elements. As in the first embodiment, the process transmitter communications circuit 96 is coupled to a sensor 14, a microprocessor 16 and a modem 18. The process transmitter communications circuit 96 includes a power source 38, link terminals 40, communications circuitry 42, power sensing component 44, and power control component 46.

In the second embodiment, the power sensing component 44 includes a power sensing circuit 97 which is formed of a voltage divider 98, a buffer 104 and a filter 106. Voltage divider 98 includes resistors 100 and 102, and provides buffer 104 with a voltage signal that is indicative of the level of power on the process link 12. The buffer 104 receives the voltage signal and generates a voltage VSENSE which is applied to the microprocessor 16. In alternative embodiments, the buffer 104 and the filter 106 are removed. The microprocessor 16 monitors the level of VSENSE and determines whether the power on the process link 12 is adequate to generate the process signal 56 by controlling the loop current between 4–20 mA as a function of the measured process variable and to modulate the transmitter signal on the process signal 56.

The function of the control component 46 is performed in part by the diode 64 and in part by the microprocessor 16. As in the first embodiment, when the voltage on the process link 12 drops below a specified level, the diode 64 becomes forward biased and applies current from the power source 38 to the modulator 70. In addition, once the microprocessor 16 determines there is inadequate power on the process link 12, the microprocessor 16 sets the DC current level through modulator 70 to a nominal level that will permit transmission of at least some of the information signal 48 for a particular protocol. For HART communications, the nominal current level is about 1.0 mA. The microprocessor 16 no longer controls the loop current between 4–20 mA as a function of the measured process variable. When current flow through the modulator 70 is below about 4.0 mA, there is inadequate current to transmit an effective analog process signal, but there is enough current to transmit the transmitter signal.

The microprocessor 16 controls the DC current level through the modulator 70 by providing a programmed signal on process signal transmission line 34. This signal passes through operational amplifier 68 to the current control input of the modulator 70, and thereby sets the current through the modulator to the nominal, fixed level. The modulated signal on the transmitter signal line 32 is summed with the programmed signal on the process signal line 34 at summing node 80, thereby allowing transmission of the transmitter signal through the modulator 70 even though there is inadequate power on the process link 12 to transmit the process signal 56.

In one embodiment, the microprocessor 16 closes the switch 28 such that the modem 18 transmits the transmitter signal directly to the process link 12 as an analog voltage upon the occurrence of a predetermined condition such as low power on the process link 12. The switch 28 is preferably compatible with an analog voltage signal and can include a solid state switch, a gate, or an electromechanical switch, for example. In another embodiment, the diode 64 is replaced with a switch which is controlled by the microprocessor 16 for selectively coupling the power source 38 to one of the link terminals 40 as a function of the VSENSE output of operational amplifier 68.

An advantage of the second embodiment is that a more reliable transmitter signal can be communicated under inadequate power conditions since the current through modulator 70 is set to a fixed value, and the transmitter does not attempt to transmit the process signal 56 by controlling the current drawn from the power supply 38. By setting the current through the modulator 70 to a fixed value, the process transmitter communications circuit 96 can operate in the range of about 5–10 VDC to communicate the transmitter signal. The second embodiment also has the advantage of performing more consistently when inadequate power creates hysteresis in the power sensing component 44. In the second embodiment, the process transmitter communications circuit 96 is configured for the HART communications protocol but could be configured for another communications protocol such as Fieldbus.

Figure 5:
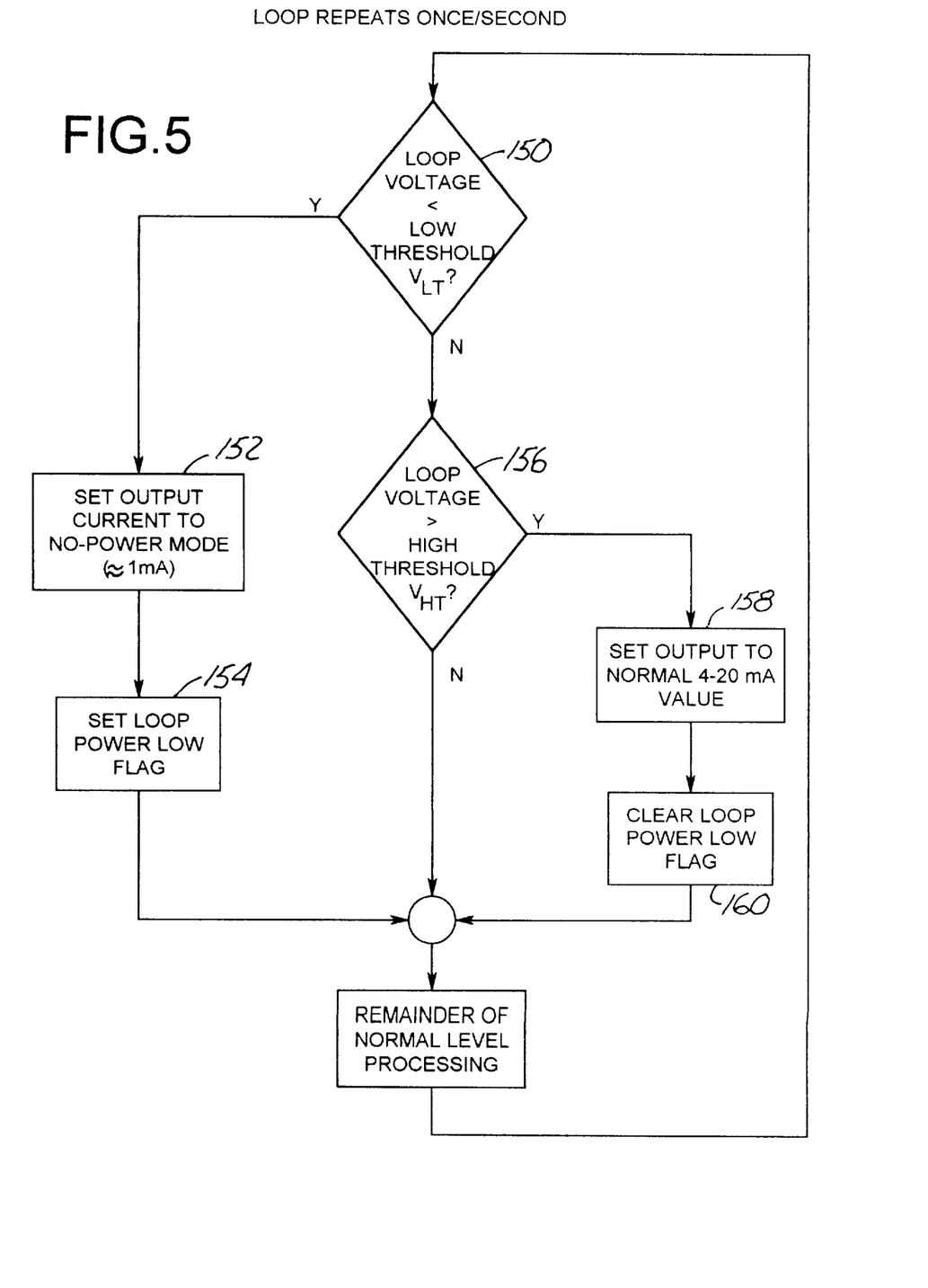
FIG. 5 is a flowchart of the operation of the second embodiment.

FIG. 5 is a flowchart showing the operation of the microprocessor 16 in the second embodiment. At step 150, microprocessor 16 determines whether the power on the process link 12 is adequate or inadequate for transmission of the process signal 56. If the microprocessor 16 determines that the power is inadequate, then the microprocessor 16 sets the current through the modulator 70 to a predetermined level such as 1.0 mA, at step 152, and sets an error flag, at step 154. The predetermined level of 1.0 mA has the advantage of being well below the range of most process signals, so a technician that is monitoring the current over the process link 12 is alerted that a low power condition exists. The 1.0 mA level does not mask the low power condition.

Microprocessor 16 returns to normal processing, at step 156, and repeats the power level check, at step 150, about once every second. The microprocessor 16 uses a low threshold $V_{LT}$ and a high threshold $V_{HT}$. The difference between the low threshold $V_{LT}$ and the high threshold $V_{HT}$ is the power sensing hysteresis for a particular environment. In one embodiment, the microprocessor 16 is programmed to instruct the process transmitter 10 to communicate a predetermined transmitter signal, such as a notice of a low power condition, to the process device 50 upon reaching a predetermined voltage threshold. If the loop voltage is greater than $V_{LT}$ and $V_{HT}$ then the loop power is adequate and microprocessor 16 sets the loop current to the normal 4–20 mA range as a function of the measured process variable, at step 158, and clears the loop power low error flag, at step 160. If the loop voltage is greater than $V_{LT}$ but less than $V_{HT}$, then the loop power is still inadequate and the microprocessor 16 continues to operate in low power mode.

Figure 6A:
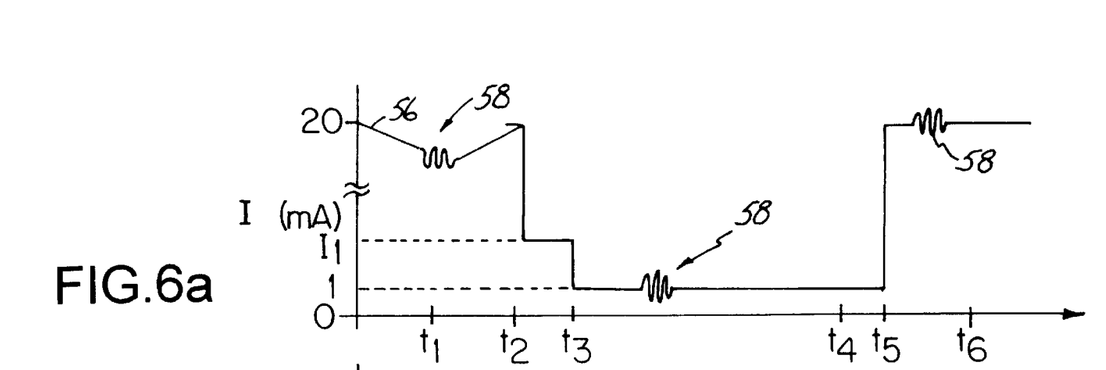
FIGS. 6a–6c are signal timing diagrams of process link current, power component control current and process link voltage during operation of the second embodiment.
Figure 6B:
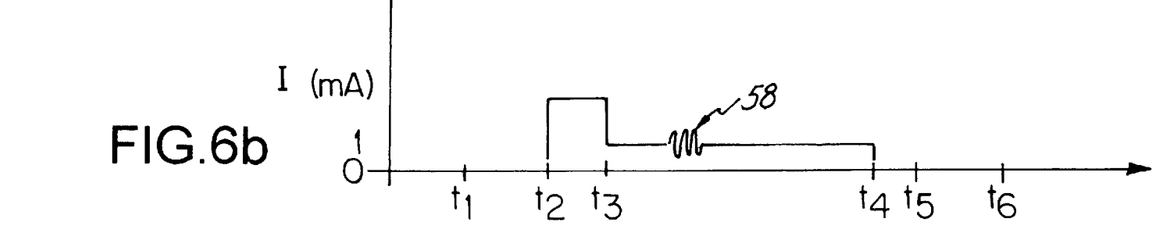
Figure 6C:
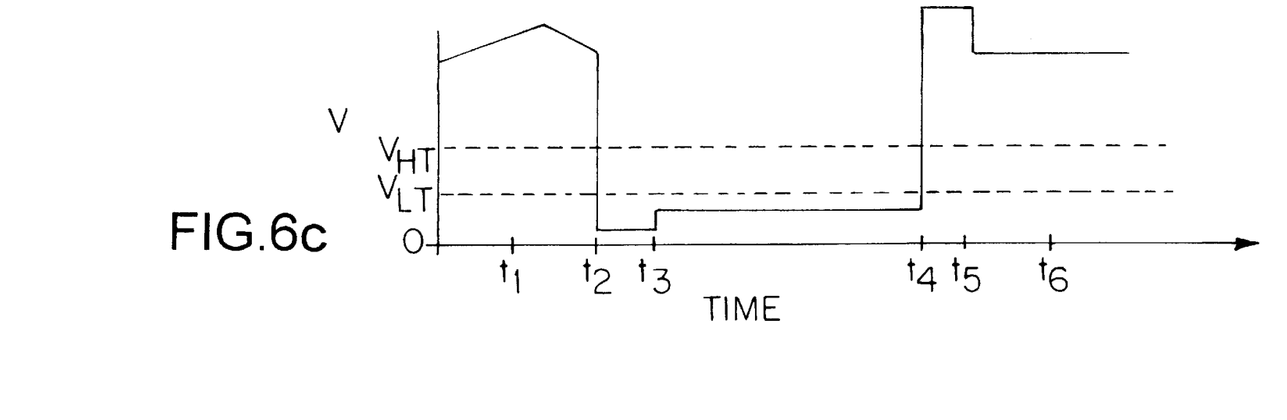

FIGS. 6a–6c are signal timing diagrams of the current through the modulator 70, the current from the power supply 38, and the voltage sensed by the power sensing component 44, respectively, and are arranged on the same time base. The process transmitter communications circuit 96 of the second embodiment operates similarly to the first embodiment until the microprocessor 16 makes a determination that the power on the process link 12 is inadequate and sets the power to a fixed level.

At time $t_1$, the power on the process link 12 is being provided by the process device 50. The power sensing component 44 is sensing the voltage on the process link 12. The communications circuitry 42 is transmitting the process signal 56 by controlling the level of DC current through the modulator 70 and is transmitting the transmitter signal 58 by modulating the transmitter signal on the process signal 56. FIG. 6b shows substantially no current flowing from the power source 38 to the modulator 70 because diode 64 is reverse biased. FIG. 6c shows that the voltage on the process link 12 is well above both the high threshold $V_{HT}$ and low threshold $V_{LT}$. From $t_1$–$t_6$, the power sensing component 44 is continuously sensing the voltage on the process link 12.

At time $t_2$, the power on the process link 12 is interrupted. FIG. 6a shows the current through the modulator 70 dropping until diode 64 becomes forward biased. As the diode 64 becomes forward biased, current begins to flow from the power source 38 into the modulator 70 at a level $I_1$, which is above 1.0 mA, as shown in FIG. 6b. FIG. 6c shows that the sensed voltage drops below the low threshold $V_{LT}$. The power sensing component 44 senses the drop in voltage and supplies the sensed voltage VSENSE to the microprocessor 16.

At time $t_3$, the microprocessor 16 has made a decision that there is inadequate power to transmit the process signal 56 by controlling the loop current between 4–20 mA. The microprocessor 16 adjusts the current through the modulator 70 to a selected level, such as 1.0 mA, that will support communication of the transmitter signal 58, rather than controlling the current as a function of the measured process variable. FIGS. 6a and 6b show the current being set to 1.0 mA. The interval between $t_2$ and $t_3$ is the time programmed for the microprocessor 16 to make the decision. This time period is preferably about 1.0 second. FIG. 6c shows that the sensed voltage continues to be below the low threshold $V_{LT}$, indicating that there continues to be a need for the power source 38 to supply some or all of the current through the modulator 70.

At time $t_4$, the sensed voltage increases, indicating the power on the process link 12 has been restored. Until the microprocessor 16 evaluates the sensed voltage, the microprocessor 16 maintains the current through the modulator at about 1.0 mA. FIG. 6b shows that current flow from the power source 38 current into the modulator 70 has stopped because power on the process link 12 has been restored and the diode 64 is once again reverse biased.

At time $t_5$, the microprocessor 16 determines that the power on the process link 12 has been restored and no longer holds the current to about 1.0 mA. Thereafter, the microprocessor 16 varies the current level as a function of the measured process variable, which forms the process signal 56. FIG. 6b shows current from the power source 38 remains substantially stopped because the diode 64 continues to be reserved biased. FIG. 6c shows the sensed voltage returning to a level that corresponds with the 4–20 MA current through the process link 12. At $t_6$, the process transmitter is communicating normally as described above.

Figure 7:
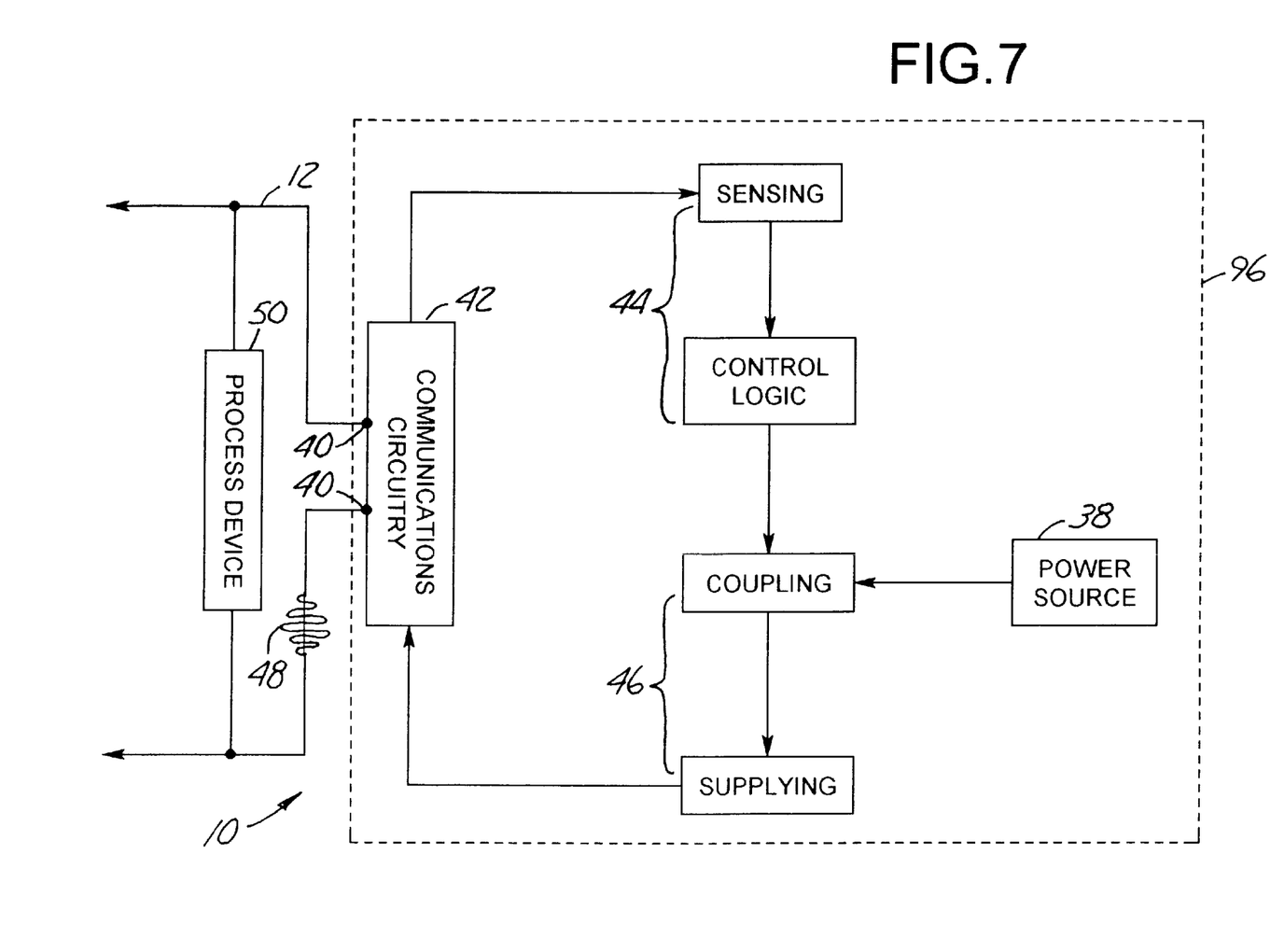
FIG. 7 is a diagram illustrating a method for communicating during inadequate process link power used by the process transmitter communications circuit.

FIG. 7 is a diagram illustrating a method for communicating with the process transmitter communications circuit 96 during inadequate process link power. Commissioning of the process transmitter to perform diagnostic testing and set up is significantly simplified by the improvement in the process transmitter communications circuit 42. During commissioning, the process transmitter link terminals 40 are connected to a remote controller such as a Rosemount® Model 268 HART® Smart Family interface in an area such as a shop workbench. A separate power source and load resistor are not required to be connected to the link terminals 40 during commissioning. Commissioning therefore requires less equipment, is faster because there are fewer connections, and is safer because less equipment is involved.

Field diagnostic testing and set-up changes to an installed process transmitter 10 are also simplified. A field technician need only carry a remote controller to the potentially difficult to access and hazardous field location to perform diagnostic testing and make set-up changes. In addition, the field technician need not carry a separate power source along with a load resistor and wire to the field location to perform field diagnostic testing and make set-up changes. Field test and set-up changes require less equipment, are faster because there are fewer connections, and are safer because less equipment is involved in potentially difficult to access and hazardous locations.

Communications under conditions of inadequate power on the process link 12 when an installed process transmitter 10 is operating in the current sink mode are significantly improved by the process transmitter communications circuit 42. In some configurations, with a relatively large power supply 38, the transmitter signal can continue to be transmitted to the process device 50 during low power conditions. As a result, during periods of inadequate power, there is much less disruption to the process, and a reduced need dispatch a technician to the process transmitter 10 to make an assessment because the process transmitter 10 continues to have the capability to communicate with another process device 50.

Although the present invention has been described with reference to preferred embodiments, workers skilled in the art will recognize that changes may be made in form and detail without departing from the spirit and scope of the invention.

What is claimed is:

1. A process transmitter communications circuit for coupling to a process link which supplies power to the circuit, the circuit comprising:

link terminals which are adapted to couple to the process link;

a power source coupled to at least one one of the link terminals and independent from the power supplied from the process link;

communications circuitry coupled to the power source and link terminals, which is adapted to transmit an analog process signal and a digital transmitter signal over the process link, through the link terminals, wherein analog process signal has an analog level which is controlled by the communications circuitry based on a process variable;

a power sensing component coupled to at least one of the link terminals and the communications circuitry, which is adapted to sense whether the power supplied by the process link is inadequate to transmit the transmitter signal; and a power control component coupled to the power source, the link terminals and the communications circuitry which is adapted to selectively apply power from the power source to the communications circuitry, the communications circuitry being adapted to transmit the digital transmitter signal, but not the analog process signal, with the power supplied by the power source when the power sensing component senses there is inadequate power supplied by the process link.

2. The process transmitter communications circuit of claim 1 wherein the power control component directs a predetermined level of current from the power source to the communications circuitry when the power sensing component senses there is inadequate power supplied by the process link to transmit the digital transmitter signal and wherein the communications circuitry comprises a modulator which modulates the predetermined level of current to produce the digital transmitter signal.

3. The process transmitter communications circuit of claim 1 wherein the digital transmitter signal comprises status information relating to the transmitter and wherein the communications circuitry continues to transmit the status information during periods of inadequate power supplied by the process link.

4. The process transmitter communication circuit of claim 1 and further comprising a process sensor which has a sensor output, a signal processor which is coupled to the sensor output and has a process signal output, and a modem which is coupled between the process signal output and the communications circuitry.

5. The process transmitter communications circuit of claim 4 wherein the process sensor is selected from the group consisting of level, mass, flow, pressure, and temperature process sensors.

6. The process transmitter communications circuit of claim 1 wherein the link terminals form a process connection selected from the group consisting of a two-wire process loop connection, a process bus connection, a point-to-point process connection, a daisy chain process connection, and a tree process connection.

7. The process transmitter communications circuit of claim 1 wherein the communications circuitry has a commissioning mode of operation and wherein the communications circuitry is powered solely from the power source when in the commissioning mode.

8. The process transmitter communications circuit of claim 1 wherein the power sensing component includes a diode that is connected between the power source and one of the link terminals.

9. The process transmitter communications circuit of claim 8 wherein the control component also includes the diode that is connected between the power supply and one of the link terminals.

10. The process transmitter communications circuit of claim 8 and further comprising:
    a process sensor which measures the process variable;
    a microprocessor which is coupled between the process sensor and the communications circuitry;
    the communications circuitry comprises a modulator coupled to the link terminals; and
    wherein the microprocessor has a control output coupled to the communications circuitry which controls a level of current flowing through the modulator as a function of the process variable measured by the process sensor to generate the analog process signal and which modulates the current flowing through the modulator to generate the digital transmitter signal.

11. The process transmitter communications circuit of claim 10 wherein the power source supplies power sufficient for the modulator to generate the digital transmitter signal but insufficient for the modulator to generate the analog process signal when the power sensing component senses that the power supplied by the process link is inadequate.

12. The process transmitter communications circuit of claim 8 wherein the diode is reverse biased when the power supplied by the process link is greater than a threshold level and is forward biased when the power supplied by the process link is less than the threshold level.

13. The process transmitter communications circuit of claim 1 and further comprising:
    a process sensor which measures the process variable;
    a microprocessor which is coupled between the process sensor and the communications circuitry;
    the communications circuitry comprises a modulator coupled to the link terminals;
    the power sensing component comprises a sensed voltage output indicative of the voltage supplied by the process link;
    wherein the microprocessor forms the power control component and switches between a normal power mode when the sensed voltage output is greater than a threshold and a low power mode when the sensed voltage output is less than the threshold;
    wherein the microprocessor has a control output coupled to the communications circuitry which, when in the normal power mode, controls a level of current flowing through the modulator as a function of the process variable measured by the process sensor to generate the analog process signal and which modulates the current flowing through the modulator to generate the digital transmitter signal; and
    wherein the control output of the microprocessor, when in the low power mode, sets the level of current flowing through the modulator to a predetermined level independent of the process variable measured by the process sensor and modulates the current flowing through the modulator to generate the digital transmitter signal on the process link.

14. The process transmitter communications circuit of claim 13 wherein the modulator comprises a transistor coupled to the link terminals and wherein the control output of the microprocessor operates the transistor to control current flow through the link terminals to permit transmission of the digital transmitter signal.

15. The process transmitter communications circuit of claim 1 wherein the power sensing component comprises a voltage divider coupled to one of the link terminals.

16. The process transmitter communications circuit of claim 15 wherein the power sensing component further comprises a diode that is connected between the power supply and one of the link terminals.

17. The process transmitter communications circuit claim 16 wherein the diode becomes forward biased when the power supplied by the process link is less than a threshold level; wherein the communications circuitry comprises a current control element that controls the level of current flowing through the link terminals; and wherein the power control component comprises a microprocessor coupled to the voltage divider and the current control element for setting the level of current flowing through the link terminals to a predetermined level that will permit transmission of the digital transmitter signal when the power supplied by the process link is less than a threshold level.

18. The process transmitter communications circuit of claim 1 and further comprising a modem having a transmitter output line coupled to the communications circuitry; and a switch which connects the transmitter output line to one of the link terminals and which is operated by the microprocessor to allow transmission of a voltage signal, which is generated by the modem on the transmitter output line, directly to the process link.

19. A method of transmitting an analog process signal and a digital transmitter signal over a process link with a process transmitter which is powered by the process link, the method comprising:
    coupling the process transmitter to the process link through link terminals;
    sensing whether the power supplied by process link is above or below a threshold level;
    transmitting the analog process signal and the digital transmit signal over the process link with a communications circuit in the transmitter when the power supplied by the process link is above the threshold level;
    selectively coupling a power source, which is independent from the power supplied by the process link, to one of the link terminals to supply power from the power source to the communications circuit when the power supplied by the process link is below the threshold level; and transmitting the digital transmit signal, but not the analog process signal over the process link with the communications circuit when the power supplied by the process link is below the threshold level.

20. A transmitter for use in a process control system, comprising:

a sensor for sensing a process variable and generating a sensor signal which is representative of the process variable;

information means for providing transmitter information;

a microprocessor coupled to the sensor and the information means for receiving the sensor signal and the transmitter information and responsively providing a data output;

an independent power source providing a power output;

communication circuitry comprising:
  a data input coupled to the data output of the microprocessor;
  first and second loop terminals adapted for coupling to a process control loop;
  a modulator coupled to the data input and the first and second loop terminals, which is adapted to control an analog signal level on the process control loop through the first and second loop terminals in response to the data input and based on the sensor signal and is adapted to digitally modulate analog signal level in response to the data input and based on the transmitter information; and
  a power sense connection coupled to the microprocessor and the loop providing an output related to power on the process control loop;

wherein the microprocessor controls the communication circuitry based upon the power detected through the power sense connection to selectively operably couple the power output to the loop terminals in response to a condition in which the loop is not powered, and operates the communication circuitry so that the modulator sets the analog signal level to a predetermined level independent of the sensor signal and digitally modulates the predetermined level based on the transmitter information during the condition.

* * * * *

UNITED STATES PATENT AND TRADEMARK OFFICE
CERTIFICATE OF CORRECTION

PATENT NO. : 6,006,338
DATED : December 21, 1999
INVENTOR(S) : Randy J. Longsdorf et al.

It is certified that error appears in the above-identified patent and that said Letters Patent is hereby corrected as shown below:

[73]   Assignee:

Delete "Rosemont Inc." and insert
--Rosemount Inc.--.

Signed and Sealed this

First Day of May, 2001

Attest:

NICHOLAS P. GODICI

*Attesting Officer*       *Acting Director of the United States Patent and Trademark Office*